(12) United States Patent
Fish et al.

(10) Patent No.: US 10,162,133 B2
(45) Date of Patent: Dec. 25, 2018

(54) LOW LOSS HETEROGENEOUS OPTICAL WAVEGUIDE TRANSITIONS

(71) Applicant: Aurrion, Inc., Goleta, CA (US)

(72) Inventors: Gregory Alan Fish, Santa Barbara, CA (US); Jae Shin, Goleta, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 15/819,521

(22) Filed: Nov. 21, 2017

(65) Prior Publication Data

US 2018/0088290 A1    Mar. 29, 2018

Related U.S. Application Data

(63) Continuation of application No. 13/444,635, filed on Apr. 11, 2012, now Pat. No. 9,846,285.

(51) Int. Cl.
| | |
|---|---|
| *G02B 6/42* | (2006.01) |
| *G02B 6/30* | (2006.01) |
| *G02B 6/122* | (2006.01) |
| *G02B 6/12* | (2006.01) |

(52) U.S. Cl.
CPC ......... *G02B 6/4203* (2013.01); *G02B 6/1228* (2013.01); *G02B 6/305* (2013.01); *G02B 2006/12061* (2013.01); *G02B 2006/12078* (2013.01)

(58) Field of Classification Search
CPC .............................. G02B 6/4203; G02B 6/305
See application file for complete search history.

(56) References Cited

U.S. PATENT DOCUMENTS

| | | |
|---|---|---|
| 7,082,235 B2 | 7/2006 | Gunn, III |
| 2013/0272646 A1 | 10/2013 | Fish et al. |

OTHER PUBLICATIONS

U.S. Appl. No. 13/444,635, filed Apr. 11, 2012, Low Loss Heterogeneous Optical Waveguide Transitions.
"U.S. Appl. No. 13/444,635, Appeal Brief filed Jun. 8, 2015", 12 pgs.
"U.S. Appl. No. 13/444,635, Final Office Action dated Dec. 4, 2014", 7 pgs.
"U.S. Appl. No. 13/444,635, Non Final Office Action dated Apr. 1, 2014", 7 pgs.
"U.S. Appl. No. 13/444,635, Notice of Allowance dated Jul. 26, 2017", 7 pgs.

(Continued)

*Primary Examiner* — Jerry Rahll
(74) *Attorney, Agent, or Firm* — Schwegman, Lundberg & Woessner, P.A.

(57) ABSTRACT

Embodiments of the invention describe optical devices including a III-V slab having a taper including a first region and a second region smaller than the first. Said first region receives light and confines an optical mode of the received light; thus, as opposed to the prior art solutions, said III-V regions of optical devices perform the optical function of mode confinement. Embodiments of the invention further describe optical devices including a silicon slab to receive light from said III-V slab, and having a taper including a first silicon region and a second silicon region smaller than the first. Said first region receives light and confines an optical mode of the received light.
Thus, embodiments of the invention describe optical devices created with a low loss transition from hybrid regions to silicon regions with fewer restrictions on the design of the silicon waveguides and the III-V waveguides.

18 Claims, 6 Drawing Sheets

(56) References Cited

OTHER PUBLICATIONS

"U.S. Appl. No. 13/444,635, Notice of Allowance dated Oct. 5, 2017", 6 pgs.
"U.S. Appl. No. 13/444,635, Response filed Jul. 31, 2014 to Non Final Office Action dated Apr. 1, 2014", 11 pgs.
"European Application Serial No. 13001226.3, Extended European Search Report dated Apr. 23, 2015", 6 pgs.
Lamponi, M, "Low-Threshold Heterogeneously Integrated InP/SOI Lasers With a Double Adiabatic Taper Coupler", IEEE Photonics Technology Letters, vol. 24, No. 1, (2012), 76-78.
Moerman, I, et al., "A Review on Fabrication Technologies for the Monolithic Integration of Tapers with III-V Semiconductor Devices", IEEE Journal of Selected Topics in Quantum Electronics, 3, (Dec. 1997), 1308-1320.

LOW LOSS HETEROGENEOUS OPTICAL WAVEGUIDE TRANSITIONS this application is a continuation of U.S. patent application Ser. No. 13/444,635, filed Apr. 11, 2012, which is incorporated by reference herein in its entirety.

FIELD

Embodiments of the invention generally pertain to optical devices and more specifically to optical waveguide transitions in III-V/silicon hybrid optical devices.

BACKGROUND

Current solutions exist for integrating electronic and photonic devices on a single substrate—i.e., making photonic integrated circuits on silicon. By bonding a wafer of III-V material as an active region to silicon and removing the substrate, lasers, amplifiers, modulators, and other devices can be processed using standard photolithographic techniques on the silicon substrate. The coupling between the silicon waveguide and the III-V gain region allows for integration of low threshold lasers, tunable lasers, and other photonic devices with integrated circuits; however, there only limited solutions for coupling between hybrid and silicon-only waveguides exist.

Figure 1A:
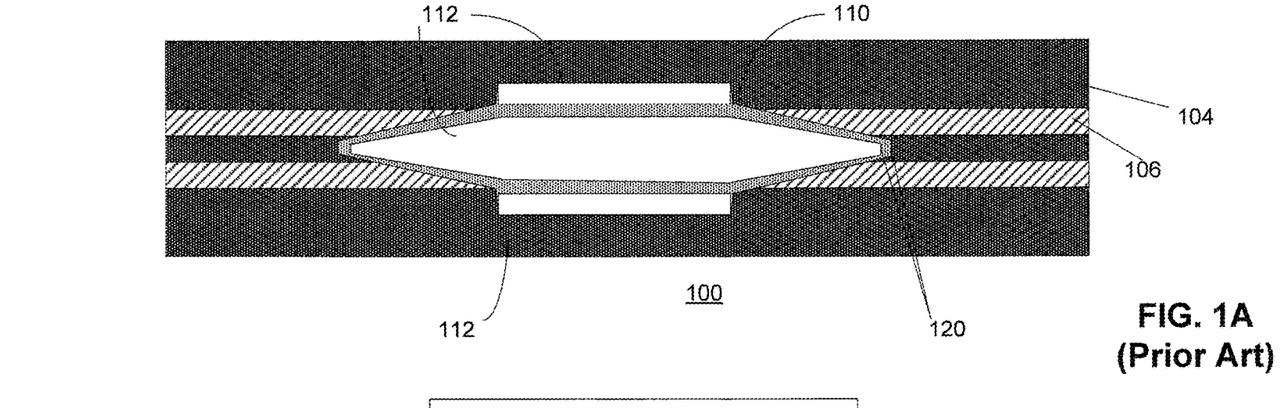
FIGS. 1A-1C are diagrams of a prior art hybrid III-V/silicon optical devices.
Figure 1B:
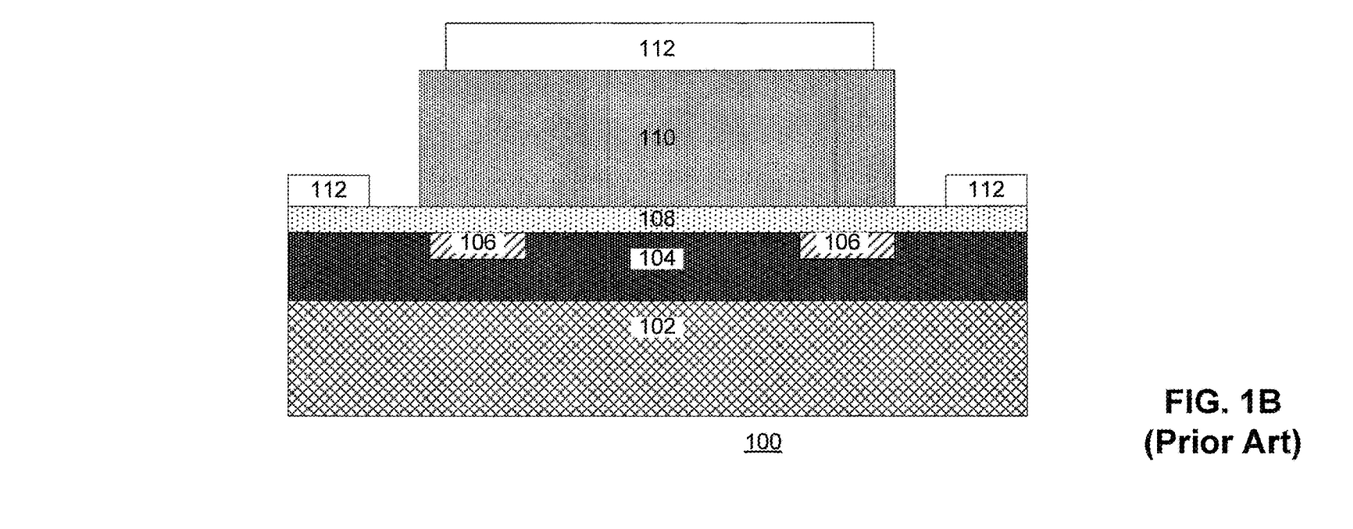
Figure 1C:
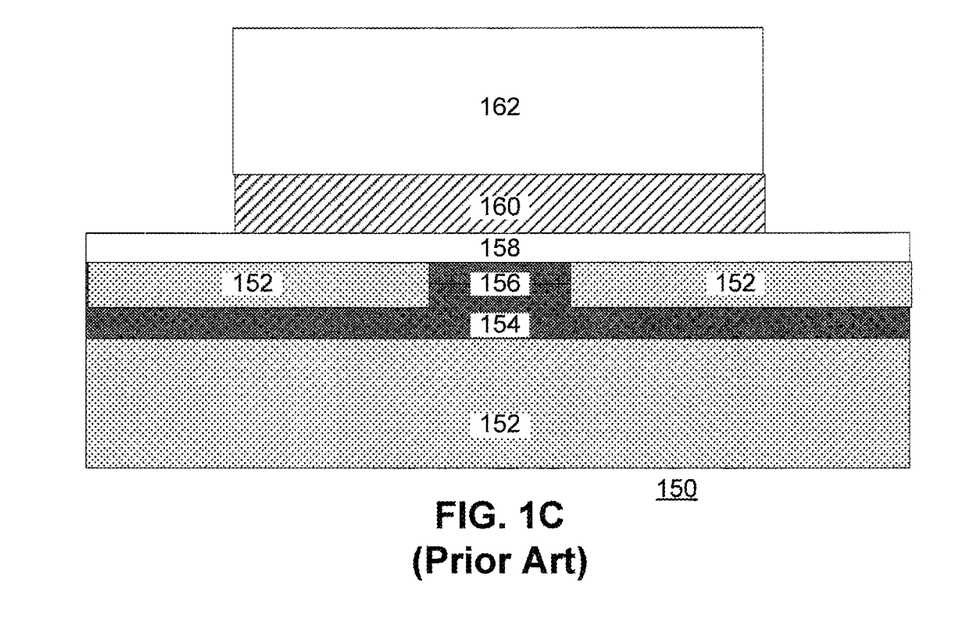

FIGS. 1A-1C are diagrams of prior art hybrid III-V/silicon optical devices. Optical device 100 of FIG. 1A and FIG. 1B includes buried oxide (BOX) layer 102 and silicon semiconductor layer 104, which together form a silicon-on-insulator (SOI) structure. Prior art device 100 further includes air gaps 106 for providing lateral optical mode confinement.

III-V layers 108 and 110 form the active regions of device 100, and, along with electrical contacts 112, are bonded to the above described SOI structure to form lasers, amplifiers, modulators, and other hybrid optical devices.

Prior art device 100 uses an evanescent coupling approach between its hybrid and silicon only waveguides. In this approach the III-V waveguide dimensions are reduced (i.e., tapered, as shown in the top view of device 100 in FIG. 1A) and the optical mode power is maintained in the silicon waveguide (i.e., the fundamental mode is transformed into a mode where the majority of the mode power is in the silicon waveguide). The III-V material is then truncated at tip 120.

There are several issues with prior art device 100. First, air gaps 106 create mechanical instability for the device. Second, efficiency of device 100 comes from tip 120—the narrower the tip, the less scattering loss will occur, and the more optically efficient the device is. Current state of the art III-V semiconductor processing (i.e., lithography) is limited, thus it is difficult to make tip 120 small, and thereby difficult to make device 100 efficient. This constraint causes a tradeoff between the confinement of the optical mode in the untapered region and the scattering loss at the tip.

FIG. 1C is a diagram of a prior art hybrid III-V/silicon device. Prior art optical device 150 includes BOX regions 152, silicon layer 154, including ridge 156, spacer layer 158, quantum well region 160 and III-V layer 162. In this device, because III-V layer 162 does not participate in lateral confinement, there will always be structures required in silicon layer 154—i.e., via ridge 156, for lateral waveguiding. This structure limits the lower refractive index that can be achieved.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe methods and apparatuses for utilizing low loss heterogeneous optical waveguide transitions in hybrid III-V/silicon optical devices. Said hybrid optical devices comprise silicon and III-V semiconductor material. III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the hybrid optical devices described below; in embodiments of the invention, said hybrid devices utilize low loss heterogeneous optical waveguide transitions between the devices' hybrid and silicon-only waveguides.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

FIGS. 2A-2D illustrate an optical device and optical device components according to an embodiment of the invention. Device 200 includes BOX layer 202, silicon layer 204, spacer layer 206, n-type III-V layer 208, quantum layer 210, and p-type III-V layer 212. Said spacer layer may comprise benzocyclobutene, silicon dioxide, SU8, or any functionally equivalent material. In this embodiment, silicon layer 204 includes silicon rib 220A/B; other embodiments may eliminate said rib without departing from the technical advantages described herein.

Figure 2A:
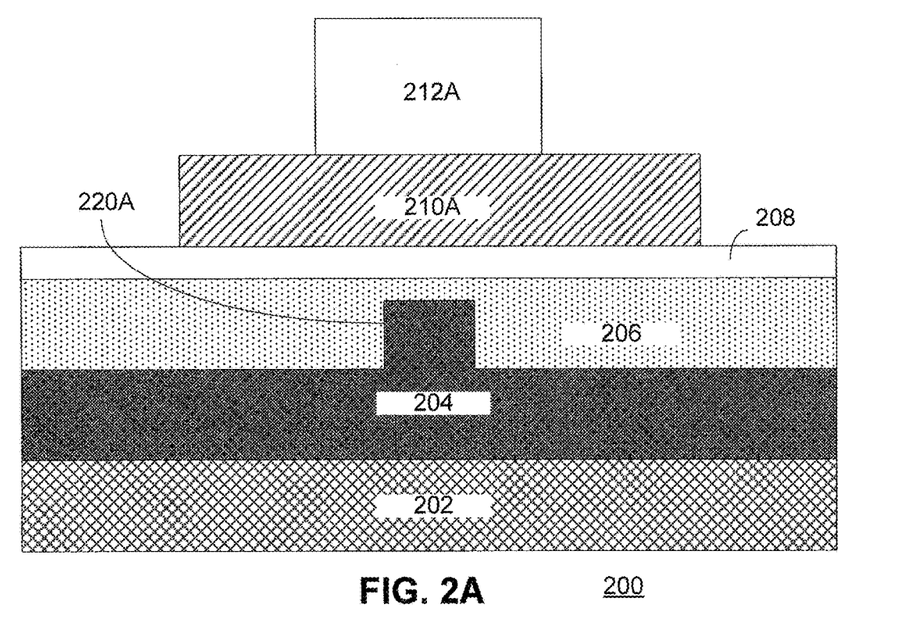
FIGS. 2A-2D illustrate an optical device and optical device components according to an embodiment of the invention.
Figure 2B:
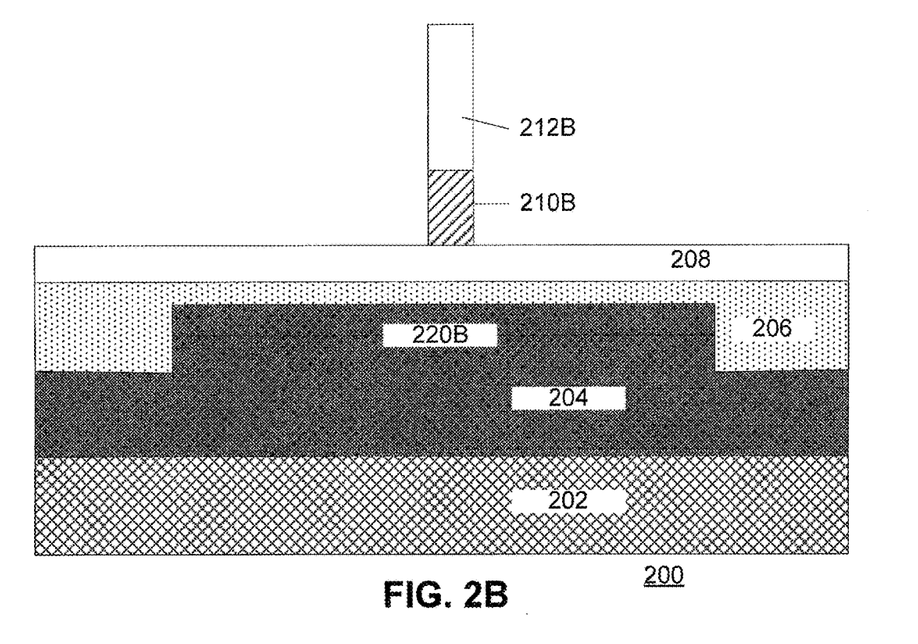
Figure 2C:
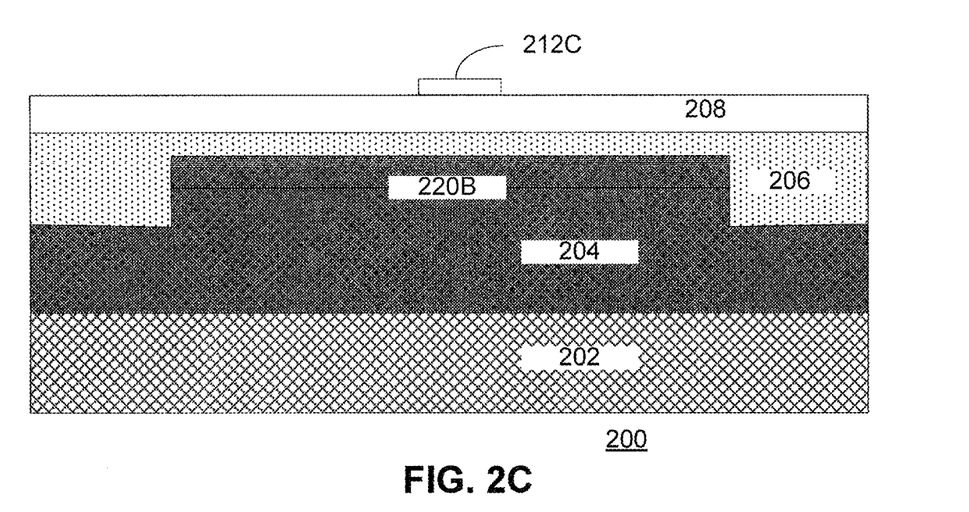

In this embodiment, optical device 200 includes a III-V slab having a taper including a first III-V region (shown as region 212A in FIG. 2A) and a second III-V region smaller than the first (shown as region 212B in FIG. 2B). Region 212A receives light and laterally confines an optical mode of the received light to a first width; thus, as opposed to the prior art solutions illustrated in FIGS. 1A-1C, the III-V region of device 200 performs the optical function of lateral mode confinement. In other embodiments, said taper may comprise a taper of height of said III-V regions, thereby performing the optical function of vertical mode confinement. Region 212B is tapered to emit light to the silicon slab of device 200.

In this embodiment, optical device 200 further includes a silicon slab having a taper including a first silicon region (shown as region 220A in FIG. 2A) and a second silicon region larger than the first (shown as region 220B in FIG. 2B). Region 220B receives light from the III-V slab (i.e., at or around region 212B), while said silicon slab is tapered to laterally confine an optical mode of the light received from the III-V slab. In other embodiments, said taper may comprise a taper of height of said silicon regions, thereby performing the optical function of vertical mode confinement of the light received from the III-V slab.

Figure 2D:
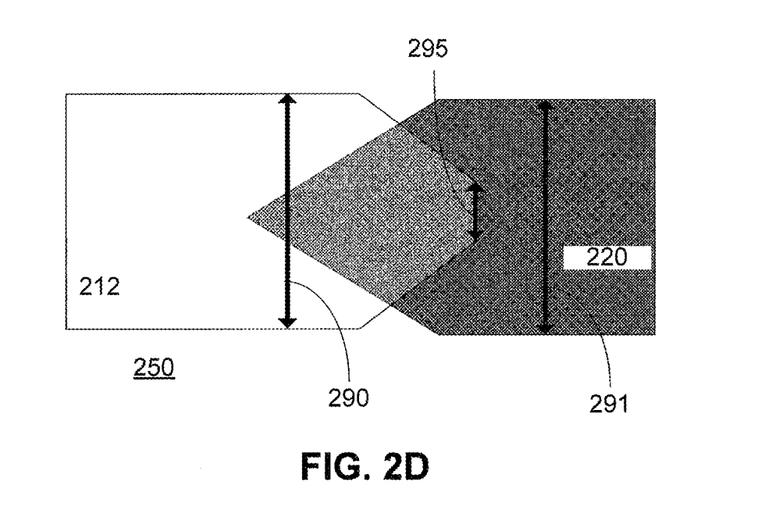

Thus, both silicon layer 220 and III-V layer 212 comprise tapered, overlaid structures, as seen in FIG. 2D, which when overlaid comprise heterogeneous III-V silicon photonic transition 250 formed by the above described III-V and silicon layers. Said heterogeneous III-V silicon photonic transition does not require any lateral waveguiding from the silicon portion of the waveguide prior to the transition. As shown in FIG. 2D, the transition contains two thicknesses in the silicon only waveguide of device 200. The first thickness is thin to the point that the fundamental mode of the hybrid III-V silicon structure resides predominately in the III-V region. The second thickness is chosen such that the fundamental mode of the hybrid III-V silicon structure resides predominately in the silicon region. The transition is accomplished by tapering the width of the thick silicon layer from zero width to a nominal width (shown as width 291 in FIG. 2D) and then by tapering the width of the III-V from a nominal width (shown as width 290 in FIG. 2D) to a smaller width (shown as width 295 in FIG. 2D, and as region 212C in FIG. 2C). Said "nominal widths" 290 and 291 may comprise equal or different values.

The thick and thin silicon may be formed by a subtractive approach where a uniformly thick layer is etched to create the silicon tapers and the thin silicon layer; however, in other embodiments, the thick and thin silicon may be formed by an additive approach where a thin layer is formed and a thicker layer is selectively deposited to form the silicon tapers and thick silicon layer. Alternately an additional layer can be uniformly deposited and etched to create the silicon tapers and thin silicon layer.

Thus, embodiments of the invention utilize independent designs of a silicon only waveguides and a hybrid III-V/silicon waveguide, as shown in device 200. By utilizing varying dimensions in these waveguides, optical devices may be created with a low loss transition from hybrid regions to silicon regions with fewer restrictions on the design of the silicon waveguides and the III-V waveguides.

Figure 3A:
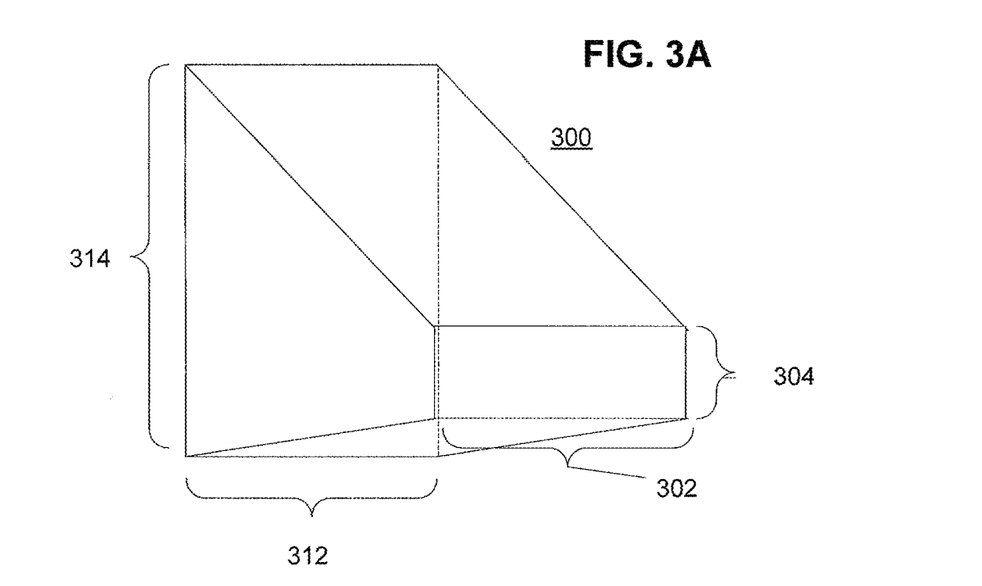
FIGS. 3A-3B are diagrams of tapered structures utilized by optical devices according to embodiments of the invention.

FIGS. 3A-3B are diagrams of tapered structures utilized by optical devices according to embodiments of the invention. Structure 300 (which may represent, for example, silicon layer 220 and III-V layer 212 as illustrated in FIG. 2D) is shown to comprise a tapered structure. In this embodiment, said structure is shown to transition from initial height 314 to smaller height 304, while the maintaining a relatively constant width (i.e., widths 312 and 302 are relatively equal). In this embodiment, by varying the height of structure 300, the potential amount of scatter loss for the eventual optical device is reduced.

Figure 3B:
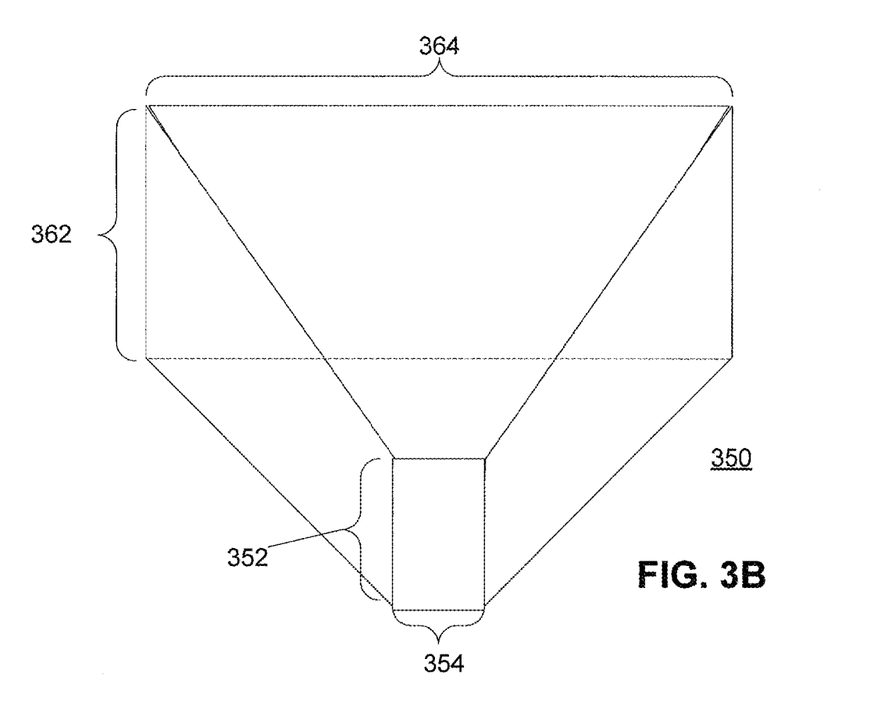

Structure 350 (which may also represent, for example, silicon layer 220 and III-V layer 212 as illustrated in FIG. 2D) is shown to comprise a tapered structure in which both the initial height and width converge to smaller values (i.e., dimensions 352 and 354 are smaller than dimensions 362 and 364, respectively). It is to be understood that having the initial height and width converge to smaller values for structure 350 reduces the potential amount of scatter loss for the eventual optical device. In other embodiments, the heights and widths of semiconductor structures may vary in any combination.

Figure 4:
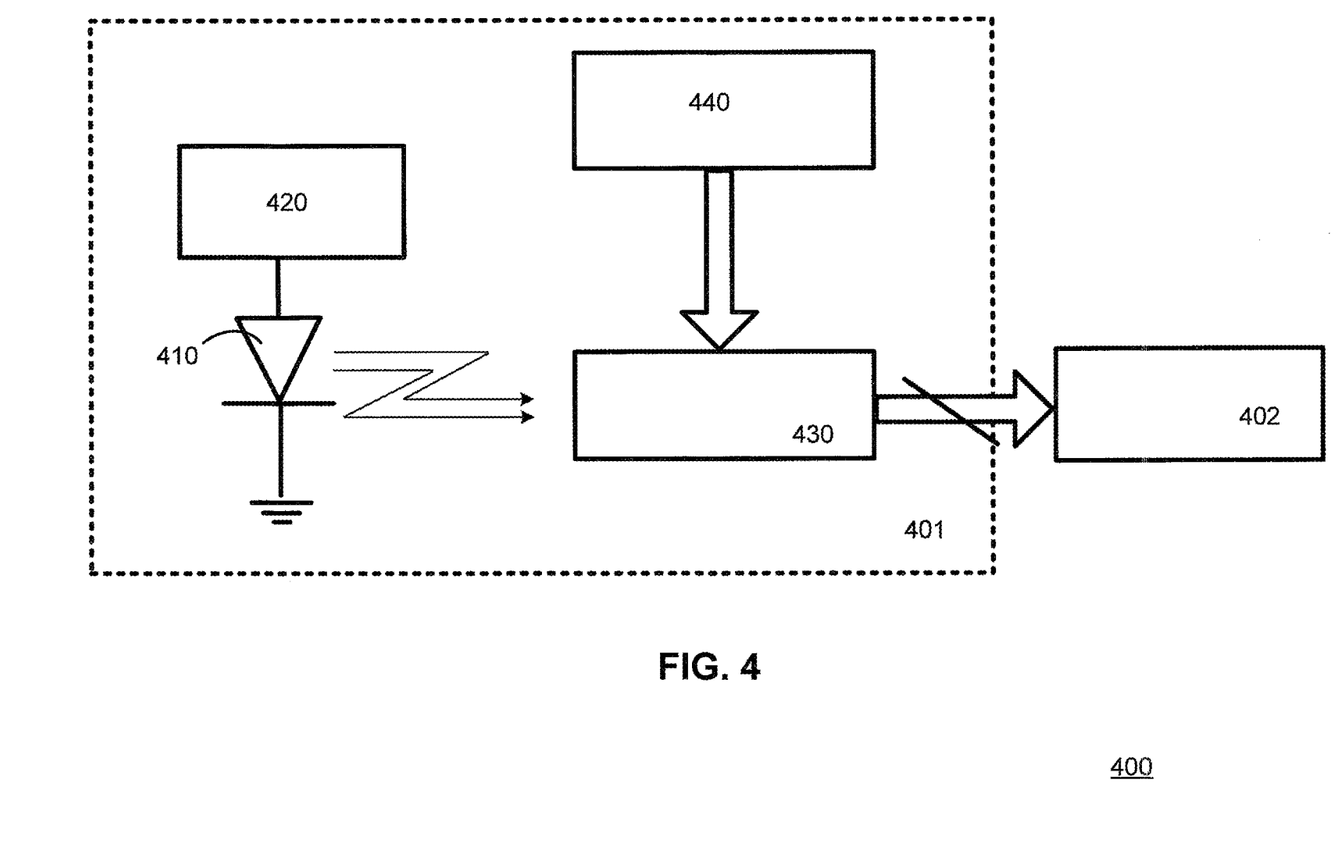
FIG. 4 is a block diagram of a simplified optical system utilizing an embodiment of the invention.

FIG. 4 is a block diagram of a simplified optical system utilizing an embodiment of the invention. System 400 includes transmitter 401 and receiver 402. Transmitter 401 includes light source 410 and light source controller 420. In the illustrated embodiment, light source 420 is a laser utilizing a hybrid active gain structure, wherein the structure comprises any embodiment of the invention described above. Light source controller 420 may control the hybrid active gain structure of light source 410 (i.e., light source controller 420 may create an electrical difference at electrical contacts of light source 410). In one embodiment, light source controller 420 comprises silicon circuitry while light source 410 comprises III-V and silicon semiconductor material. Light source 410 may transmit optical signals to modulator 430 via any transmission medium known in the art.

The structure of modulator 430 may comprise any embodiment of the invention described above. Modulator 430 may perform either amplitude or phase modulation of the light received from light source 410. In one embodiment, optical waveguides of modulator 430 are controlled by modulator controller 440 (i.e., modulator controller 440 may create an electrical difference at electrical contacts of modulator 430). The modulated output of modulator 430 may be transmitted to receiver 402 via any transmission medium known in the art.

In one embodiment, system 400 is included in a single device or chip, wherein silicon components of system 400 are included on a silicon portion of the chip, and III-V semiconductor components of system 400 are included on a III-V portion of the chip. These portions may be fabricated independently and subsequently bonded via any bonding process known in the art.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. A III-V/silicon hybrid optical device comprising:
a silicon-on-insulator structure comprising a silicon layer;
a III-V layer disposed above the silicon layer;
a silicon-only waveguide formed within the silicon layer;
a III-V waveguide formed within the III-V layer; and
a heterogeneous optical waveguide transition between the silicon-only and III-V waveguides, the heterogeneous optical waveguide transition comprising a tapered silicon structure formed within the silicon layer and, overlaid with the tapered silicon structure, a tapered III-V structure formed in the III-V layer, the tapered silicon structure and the tapered III-V structure being tapered in width in mutually opposite directions, at least the tapered silicon structure further being tapered in height.

2. The III-V/silicon hybrid optical device of claim 1, wherein the III-V waveguide is part of a hybrid waveguide, the hybrid waveguide further comprising a silicon rib in the silicon layer.

3. The III-V/silicon hybrid optical device of claim 1, wherein the III-V layer is a p-type layer, the device further comprising, between the silicon layer and the p-type III-V layer, a spacer layer disposed on the silicon layer, an n-type III-V layer disposed on the spacer layer, and a quantum layer disposed on the n-type III-V layer.

4. The III-V/silicon hybrid optical device of claim 3, wherein the spacer layer comprises at least one of benzocyclobutene, silicon dioxide, or SU8.

5. The III-V/silicon hybrid optical device of claim 1, wherein the tapered III-V structure is tapered in height.

6. The III-V/silicon hybrid optical device of claim 1, wherein the tapered silicon structure and the tapered III-V structure share a common nominal width.

7. The III-V/silicon hybrid optical device of claim 1, wherein the tapered silicon structure is formed additively.

8. The III-V/silicon hybrid optical device of claim 1, wherein the tapered silicon structure is formed subtractively.

9. A system comprising:
a light source made of silicon and III-V materials, the light source including a hybrid active gain structure comprising a heterogeneous optical waveguide transition with laterally overlapping tapered III-V and silicon structures, the tapered III-V and silicon structures each being tapered in at least one of width or height, at least one of the tapered III-V structure or the tapered silicon structure being tapered in height;
a light source controller comprising silicon circuitry, the light source controller configured to control the hybrid active gain structure by creating an electrical difference at electrical contacts of the light source;
a modulator made of silicon and III-V materials and configured to modulate light received from the light source;
a modulator controller configured to create an electrical difference at electrical contacts of the modulator; and
a transmission medium to operatively couple the light source and the modulator.

10. The system of claim 9, wherein the modulator includes a heterogeneous optical waveguide transition comprising laterally overlapping tapered III-V and silicon structures, the tapered III-V and silicon structures each being tapered in at least one of width or height, at least one of the tapered III-V structure or the tapered silicon structure being tapered in height.

11. The system of claim 9, wherein, within the heterogeneous optical waveguide transition of the light source, at least the III-V structure is tapered in height.

12. The system of claim 9, wherein, within the heterogeneous optical waveguide transition of the light source, at least one of the III-V taper or the silicon taper is tapered in both width and height.

13. The system of claim 9, wherein the light source, the light source controller, the modulator, the modulator controller, and the transmission medium form part of a transmitter, the system further comprising a receiver.

14. The system of claim 9, wherein silicon and III-V components of the system are included in a single chip.

15. The system of claim 14, wherein the silicon and III-V components are included in respective silicon and III-V portions of the chip, the silicon and III-V portions being fabricated independently and subsequently bonded.

16. The system of claim 14, wherein the chip comprises a silicon-on-insulator substrate including a silicon layer, the silicon components of the system being formed within the silicon layer.

17. The system of claim 16, wherein the chip further comprises a III-V layer disposed above the silicon layer, the III-V components being formed within the III-V layer.

18. The system of claim 17, wherein the III-V layer is a p-type layer, the chip further comprising, between the silicon layer and the p-type III-V layer, a spacer layer disposed on the silicon layer, an n-type III-V layer disposed on the spacer layer, and a quantum layer disposed on the n-type III-V layer.

* * * * *